Nov. 8, 1966    F. J. DEAN, JR    3,283,694
AIR MIXING AND SOUND ATTENUATING UNIT
Filed March 4, 1964    2 Sheets-Sheet 1

INVENTOR.
Frank J. Dean, Jr.
BY
Scofield, Kokjer, Scofield & Lowe
ATTORNEYS.

Nov. 8, 1966    F. J. DEAN, JR    3,283,694
AIR MIXING AND SOUND ATTENUATING UNIT
Filed March 4, 1964    2 Sheets-Sheet 2
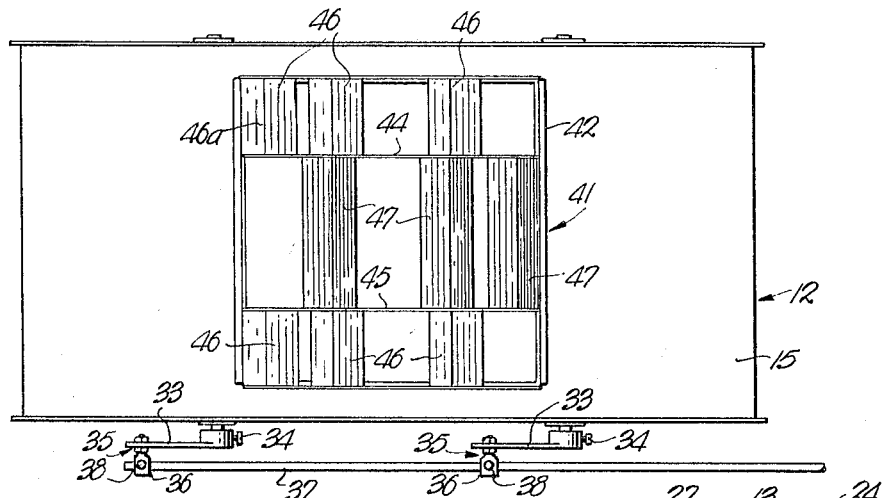
INVENTOR.
Frank J. Dean, Jr.

United States Patent Office 3,283,694
Patented Nov. 8, 1966

3,283,694
AIR MIXING AND SOUND ATTENUATING UNIT
Frank J. Dean, Jr., Kansas City, Mo., assignor to Tempmaster Corporation, a corporation of Missouri
Filed Mar. 4, 1964, Ser. No. 349,385
9 Claims. (Cl. 98—38)

This invention deals generally with apparatus employed in air conditioning systems and refers more particularly to a mixing device for receiving air moving at high velocity from separate pressure sources at different temperatures and mixing or blending it and discharging it to branch distribution ducts at a selected outgoing mean temperature and flow rate.

One of the principal objects of the invention is to provide a mixing device of the character described which is so constructed that the air discharged from the device is at uniform temperature throughout the cross section of the flow stream and no stratification or layering or pocketing of hot or cold air in the stream takes place. This is particularly important in the delivering of mixed air in a system which employs branch conduits which in turn supply a plurality of outlets. It has been found that it is not enough simply to merge the flow streams of hot and cold air. Even though merged, stratification occurs and will maintain itself for a substantial distance along the branch conduit or duct downstream of the zone of merger. The result is that lateral outlets from the conduit may receive an overabundance of either hot or cold air, depending upon the configuration of the strata and the distance from the mixing device of the lateral outlet along the conduit. My invention solves this problem through the arrangement provided for bringing the separately conditioned air streams into contact with one another during entry to the device and the discharge therefrom.

Another important object of the invention is to provide a high velocity mixing device which is capable of providing air mixing of the quality described without the generation in or transmission through the device of undesirable noise effects. The air flow through a device according to the present invention is relatively smoothly guided and, while some turbulence is created at discharge in order to obtain thorough mixing, there is no undesirable noise generation.

Still another object of the invention is to provide a high velocity mixing device of the character described in which the relative proportions of hot and cold air can be varied as desired to obtain the design temperature at discharge. A particular feature of the invention resides in the provision of a flow control and guide structure arrangement which not only accomplishes the purposes recited in the preceding paragraphs, but which also is capable of infinite adjustment of the proportions from full hot to full cold and which can be set to obtain a wide range of flow velocities.

A further object of the invention is to provide a mixing device of the character described which can be manufactured at low cost and which requires little or no maintenance over long periods of operation.

Other and further objects of the invention, together with the features of novelty appurtenant thereto, will appear in the course of the following description.

In the accompanying drawings, which form a part of the specification and which are to be read in conjunction therewith, and in which like reference numerals indicate like parts in the various views;

FIG. 3 is an end elevational view of the device taken from the left hand end of FIG. 1, the transition duct having been taken away so as to provide a clearer view of the mixing baffles;

FIG. 4 is a fragmentary sectional view taken along line 4—4 of FIG. 2 in the direction of the arrows; and FIG. 5 is a fragmentary horizontal section through a modified form of the device according to the invention.

Figure 1:
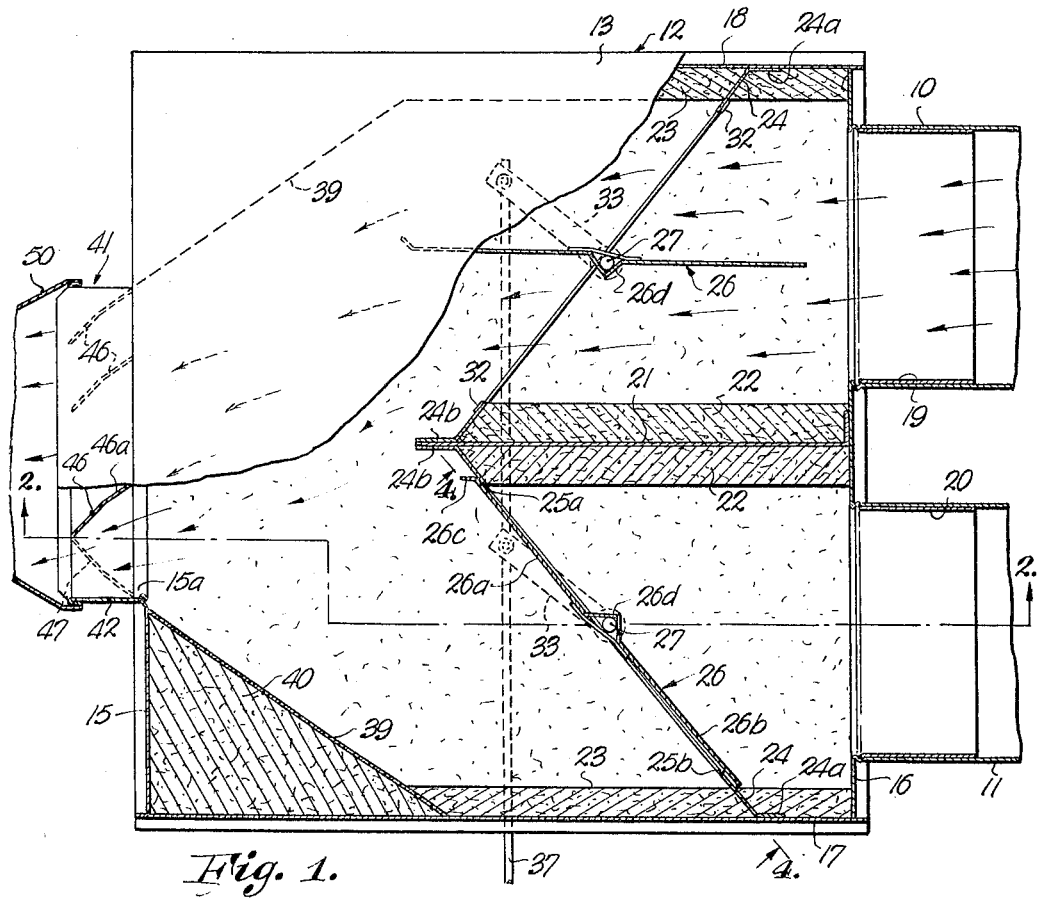
FIG. 1 is a top plan view of a mixing device embodying the invention, part of the top casing wall and its adjoining insulation layer broken away to expose the interior of the device and the intake and discharge conduits shown in section.
Figure 2:
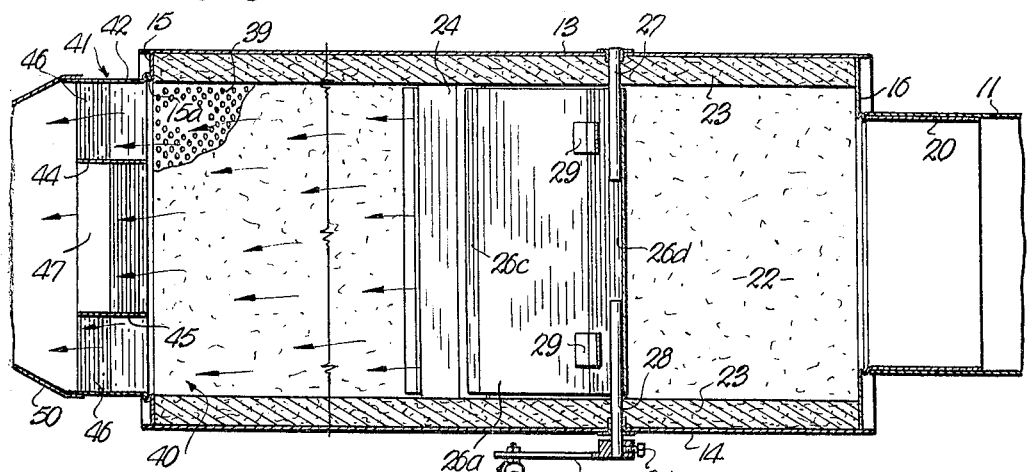
FIG. 2 is a sectional view taken along line 2—2 of FIG. 1 in the direction of the arrows.

Referring now to the drawings and initially to FIGS. 1 and 2, reference numerals 10 and 11 designate a pair of side-by-side ducts or conduits which are respectively supplied from a source (not shown) with high velocity air at the hot and cold temperature extremes for which the system is designed. For purposes of illustration, it will be assumed that duct 10 carries hot air while duct 11 carries cold air.

The mixing device in its preferred form comprises a rectangular box-like casing 12 which conveniently can be formed from sheet metal. The casing has the top wall 13, bottom wall 14, front wall 15, rear wall 16 and parallel side walls 17 and 18. The walls are joined together to form the box-like structure at their edges and corners by any convenient and conventional sheet metal connection.

The rear wall 16 of the casing is provided with spaced openings to which are secured short tube sections 19 and 20, respectively. The ducts 10 and 11 are telescopically fitted over tubular sections 19 and 20 and are secured thereto. Preferably the ducts 10 and 11 and the matching tubular sections 19 and 20 are of circular cross section.

Disposed within and centrally between the sides 17 and 18 of the casing is a vertical plate or partition 21 which extends from the top wall to the bottom wall and forwardly from the rear wall to the central zone of the casing. It is faced on both sides with fibrous acoustical insultation mat 22. This may be any suitable, commercially available duct liner material. It will be noted, incidentally, that the side walls 17 and 18 are similarly lined at 23 with a like material as are top wall 13 and bottom wall 14 at 23'.

Symmetrically arranged within the casing and proceeding from near the rear portion of the side walls 17 and 18 inwardly in converging fashion are a pair of similar plate members 24, the plan of which may best be seen in FIG. 4. Each of the plate members is rectangular in plan and has at its rearward end an inclined flange or tab 24a which provides a means of securing it to the inside wall of the casing as by spot welding. The plate members 24 extend from the top wall 13 to the bottom wall of the casing. At their forward ends they are provided with tabs 24b which merge with and sandwich therebetween the forward edge portion of the central partition plate 21. The tabs 24b and the registering portion of plate 21 can be secured together by spot welds. It will be understood that the acoustical mats 22 on the opposite sides of partition plate 21 can be cut at the forward edges to match the merging relationship of the plates 24 and that the mats 23 adjacent the side walls are interrupted to permit the plates to extend to the side walls 17 and 18.

Each of the plates 24 is provided with an opening therein having a rectangularly shaped forward portion with the edge 25a and a semicircularly curved rearward portion having the edge 25b. The radius of the semicircular edge is substantially equal to one half the height of the rectangular portion and somewhat less than the length thereof.

Cooperating with each plate opening to control the flow of air therethrough is a butterfly-type damper element 26 having substantially the same outline as the plate opening. Each damper element has a rectangularly shaped forward portion 26a and a rearward arcuately edged portion 26b. The forward edge 26c of the rectangular portion is in the form of an inclined lip, as shown. The damper elements are each independently supported for pivotal movement about parallel vertical axes coinciding with the center lines of their respective aligned upper and lower axle or shaft elements 27, 28 which extend through openings in the upper and lower casing walls and are journalled therein by appropriate bearings or bushings.

The shafts 27, 28 of each damper element are located substantially on a common axis through the longitudinal midpoint of the damper element, i.e., a point equidistant from the ends thereof. They are received in a V-shaped bend 26d formed across the damper element and are retained therein by hold-down straps 29 which transversely overlie the trough formed by the bend. The straps are secured to the damped element on opposite sides of the bend by any suitable means, such as spot welds 30. A cap screw or bolt 31 serves to secure each strap to its associated shaft so as to key the damper element to the shafts for rotation therewith.

It will be noted, particularly from FIGS. 1 and 4, that the portions of each damper element on opposite sides of the shafts do not lie in the same plane but are located in spaced parallel planes. The spacing is substantially equal to the thickness of the plate member 24 so that when the damper element is closed (which is the position illustrated for the lowermost damper element of FIG. 1), the forward rectangular portion 26a of the element lies on the downstream side of the plate member while the rearward arcuately edged portion 26b lies on the upstream side. It will be understood that the upper and lower edges of the plate opening are appropriately notched in the vicinity of the bend to receive therethrough the edges of the bend and to prevent interference or binding during the opening and closing of the damper elements as later to be described. The dimensions of the damper elements as compared with the openings in the plates, with which they are associated, are such that the corresponding edges of the damper element extend past and overlap the edges of the opening in the plate member so as to completely cover and close off the opening when the damper element is in the closed position earlier described. In order to prevent chatter and to provide a tight seal, the margin of the plate opening on that side facing the respective damper element portion should be gasketed with felt or other appropriate sealing material as indicated at 32 in FIG. 1.

Each of the lower damper shafts 28 is provided at its lower end with a laterally extending crank arm 33. The crank arm is rotatably adjustable on the shaft, being releasably secured thereto by a lateral set screw 34. The outer end of each arm carries a swivel bracket 35 having a tubular sleeve 36. An operating rod 37 is inserted in common through sleeves 36 of the respective arms and is releasably secured therein by lateral set screws 38 in the sleeves.

Turning now to a detailed description of the forward end of the device, the interior thereof on opposite sides is provided at each forward corner with an inclined partition 39 in the form of a metal plate provided with a uniform pattern of small perforations. The corner space formed by the partition is filled with sound absorbing material 40 which, preferably, is in the nature of a glass wool or bat packed in and completely filling the void behind the partition.

The front wall 15 of the casing is provided with a rectangularly shaped discharge opening 15a whose side edges substantially coincide with the forward edges of the inclined partitions 39 and whose upper and lower edges substantially coincide with the exposed surface planes of the top and bottom insulation bats 23' (see FIG. 2). Fitted into the discharge opening and secured thereto by any suitable means is the mixing baffle unit 41 now to be described.

The baffle unit comprises a rectangular tubular housing 42 which has the same height and width dimensions as the discharge opening. Interiorally the tubular housing is subdivided into three flow zones by two parallel horizontal plates 44 and 45 which extend across the housing and are equal in depth therewith. The plates are so arranged in the housing that the upper plate 44 is spaced approximately one-quarter the height of the housing from the upper edge while the lower plate 45 is spaced above the lower edge of the housing by one quarter the height of the housing. The space bounded by and between the plates is therefore approixmately one half the height of the housing.

Interposed between the upper plate 44 and the top wall of housing 42 and secured thereto are three vertically oriented vanes 46 of identical shape. Each vane is disposed at an angle with respect to a vertical plane extending axially of the housing and the angle of inclination of each each vane with respect thereto is substantially the same. I find that an angle of approximately 45° is the best but that it can be varied between 40° and 50° without appreciable change in operation. The vanes are preferably not planar, but instead are slightly curved as by providing a slight break along line 46a intermediate the fore and aft edges thereof. The degree of break is however quite small, being in the nature of 1° to 5°. It is important to note that the vanes are not symmetrically arranged across the zone in which they are located. Instead they are so concentrated that, starting out at the left hand side of FIG. 3 or at the upper edge of the baffle unit as seen in FIG. 1, the first vane has its rearward edge adjacent the side edge of the baffle unit with the next one between said edge and the vertical center line through the baffle unit and the last one on the other side of the center line.

The center zone of the baffle unit, i.e., that bounded above and below by plates 44 and 45 has a similar set of vanes 47 but arranged in substantially the reverse fashion with the vanes turned at an opposite inclination and concentrated toward the opposite side of the unit. These vanes 47 are, of course, substantially twice the height of the upper vanes 46; otherwise they are the same in construction and mounting.

The lower zone of the baffle unit, i.e., that between plate 45 and the bottom wall of housing 42 has the same vanes 46 and arrangement described for the upper zone.

While the spacing and angular inclination of the vanes in their respective zones may be varied depending upon the volumetric flow rate to be handled by the device, I have found that to obtain optimum mixing, three factors must substantially be present: (1) The upper and lower flow zones must be substantially equal in combined height to the central zone; (2) the vane orientation in the upper and lower zones must be substantially identical with each other, i.e., slanted in the same direction and with the same relative spacing; and (3) the slant of the middle vane 47 must be opposite to that of the upper and lower vanes with the spacing between vanes substantially the reverse of that for the upper and lower vane zones. In other words, and somewhat simplified in language, the baffle unit should be symmetrical in construction with respect to the horizontal centerline therethrough.

In use, the device is coupled at the discharge end with the transition element schematically shown at 50 in FIGS. 1 and 2. This may be the usual square-to-round coupling conventionally employed in air duct systems. The square end of the device is joined with the outer or discharge end of the baffle unit housing as shown and the round end connected into the duct system (not shown) leading to the space to be conditioned.

The operation of the device will be described as if the damper elements are initially positioned in the condition shown for them in FIG. 1, i.e., with the hot air damper element in the maximum open position and the cold air damper element full closed. In this condition only hot air will flow through the device from duct 10.

As the hot air stream passes through the side of the device corresponding to the location of duct 10, it is diverted from straight line flow toward the center by the inclined surface formed by plate member or partition 39 and enters the baffle unit 41. As is known, it is a characteristic of moving fluid streams that the stream, when subjected to a change of direction, tends to hug the guiding surface structure. Accordingly, as the hot air stream approaches the baffle unit, it is concentrated toward one side which is the side adjacent in the inclined partition 39.

However, the upper and lower vanes 46 being concentrated toward said side, serve to deflect and divert a portion of the stream across toward the opposite side as it enters the transition duct, thus providing a more balanced flow on departure from the baffle unit 41 into the transition duct and on into the downstream duct system.

When it is desired to temper the hot air with cold to obtain an intermediate temperature, the operating rod 37 is pulled in a direction to commence closure of the hot air damper and opening of the cold air damper. The movement of the rod is converted to pivotal movement for the dampers through the crank arm. Obviously, the dampers move simultaneously, the cold air damper progressively moving from the closed toward a full open position while the hot air damper is closed. Through the linking of the damper elements, the total flow rate through the device remains substantially constant at all times, any decrease in flow of hot air being compensated by an increase in cold air and vice versa.

When both damper elements are open, the respective hot and cold air streams are converged toward the baffle unit 41 and are thoroughly intermixed thereby as the merged streams depart therefrom. The upper and lower quarter height vanes 46 serve to divert the flow concentrated toward the upper side of the device as viewed in FIG. 1, while the central vanes 47, being oppositely disposed, tend to deflect a portion of the flow stream toward the opposite direction. The net result is to obtain a thorough intermixing of the flow stream and to remove any stratification which might exist. Both cold and hot air are thrown across the stream as the stream passes through the baffle unit and the net result is that a thoroughly intermixed stream of substantially uniform temperature throughout is delivered from the device into the discharge duct system.

It can be seen that as the damper elements move from the open, parallel orientation in the stream toward their respective closed positions, there is a tendency to subdivide and guide a large portion of the stream toward the fore and aft centerline of the device. This assists in obtaining complete mixing of the stream when both damper elements are open. The arcuate leading edge on the damper elements also provides smoothness of operation in that it assists in preventing the too rapid closing—or a tendency to bang shut—of the damper elements as they respectively approach the closed position. The build up of kinetic energy in the air stream behind the damper during closing is made more gradual by virtue of the arcuate shape. I believe also that the provision of the arcuate leading edge on the damper elements and correspondingly shaped portions of the openings with which they cooperate aids in the mixing and a further advantage gained therewith is the inhibition of whistling and undesirable noise effects.

The entire arrangement is such that there is minimal diversion of the incoming streams as they move through the device to the discharge. Any tendency to concentrate to one side or the other is broken up by the baffle unit 41. The arrangement of the incoming streams in parallelism coupled with the diverting action of the damper elements and the inclined partitions 39 provides a smooth, even flow through the device. The turbulence created at the baffle unit is not so great as to interfere with the efficiency of the device. I have found that it serves its purpose well and does so despite its simple construction and low cost.

As will be evident, the damper elements can be adjusted for any intermediate position between full hot and full cold. If it is desired to obtain a lower volumetric flow rate than that which is obtained when the dampers are set to be fully open at the limit positions, each damper can be adjusted on its shaft to change the relationship. In other words, the flow of the hot air can be restricted by annularly adjusting the damper element controlling its flow on the shafts 27, 28 so that in the position which corresponds to the closed position for the cold air damper, instead of being parallel with the stream, the hot air damper is inclined toward the closed position. Obviously, when this arrangement is made, the engagement of the damper with its sealing structure or gasket will limit the degree of opening of the cold air damper to substantially the same thing as that for the hot air damper.

It will be understood that the operating rod 37 can be manipulated by hand or can be connected to any suitable thermostatically controlled motor which will operate to respond to design temperatures and set the unit to the proper configuration on an automatic basis.

In instances where a very high flow rate is desired, the modified arrangement shown in FIG. 5 can be employed. Here, instead of there being one damper element for each flow stream, the plate member 124 is provided with two openings, each of which is fitted with a damper element 126 and mounting structure as in the preceding embodiment. These dampers are each mounted on pivotal shafts 127 which are linked together for simultaneous movement in substantially the same manner as in the earlier embodiment. It will be understood of course that I have shown only one side of the mixing device in FIG. 5 and the other side would be constructed substantially the same. The operation would be much like that of the device as disclosed in FIGS. 1 through 4. The use of two damper elements on each side instead of one merely facilitates the handling of larger flow volumes and provides more delicate control of the flow variations.

From the foregoing description, it will be seen that this invention is one well adapted to attain all of the ends and objects hereinabove set forth, together with other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a mixing and sound attenuation unit for air conditioning systems of the type having two sources of conditioned air, the combination of a hollow casing having top, bottom and opposite side walls and front and rear end walls, said rear end wall provided with a pair of inlet openings spaced from one another and on opposite sides of the fore and aft centerline through the casing, said front wall provided with a centrally located discharge outlet, an upright internal divider partition extending on said centerline forwardly from said rear end wall and terminating in a front end edge in the central portion of the casing, a pair of upright plate members each having front edge portions which are connected with said partition near said front end edge thereof, said plate members extending symmetrically rearwardly and outwardly from said partition toward said side walls and forming a barrier between the respective inlets and said outlet, each plate member having an opening therethrough, a pair of pivotal damper elements, one for each opening, said damper elements mounted to cooperate with each of said openings for opening and closing same to air flow therethrough, means for pivoting said damper elements between open and closed positions therefor with respect to the respective openings, and mixing means in said outlet having flow guiding surfaces adapted to divert portions of the air stream discharged therethrough in opposite sidewise directions with respect to said centerline.

2. The combination as in claim 1 wherein each plate member is provided with a plurality of openings, and a plurality of said damper elements associated with each plate member, one damper element for each of said openings.

3. In a mixing and sound attenuation unit for air conditioning systems of the type having two sources of conditoned air, the combination of a hollow casing having top, bottom and opposite side walls and front and rear end walls, said rear end walls provided with a pair of inlet openings spaced from one another and on opposite sides of the fore and aft centerline through the casing, said front wall provided with a centrally located discharge outlet, an upright internal divider partition extending on said center-line forwardly from said rear end wall and terminating in a front end edge in the central portion of the casing, a pair of upright plate members each having front edge portions which are connected with said partition near said front end edge thereof, said plate members extending symmetrically rearwardly and outwardly from said partition toward the side walls and providing a barrier between the respective inlets and said outlet, each plate member having an opening therethrough, a pair of pivotal damper elements, one for each opening, each damper element mounted to cooperate with its associated opening to open and close same for air flow therethrough, means for pivoting said damper elements between open and closed positions therefor with respect to their respective openings, and a mixing baffle structure mounted in said outlet, said baffle structure provided with sets of directional louver-like vanes arranged in vertically superposed zones extending horizontally across the outlet, each zone containing a plurality of said vanes and the vanes in adjacent zones being oppositely inclined in a sidewise direction with respect to said centerline.

4. The combination as in claim 3 including converging air guiding surfaces proceeding respectively forwardly and inwardly in the casing from the opposite side walls of the casing toward the sides of said outlet.

5. The combination as in claim 3 wherein each damper element is supported for pivotal movement about a vertical axis intermediate the ends thereof, that section of the damper element extending toward the front wall of the casing from said axis having marginal edge portions adapted to overlap the corresponding edges of its associated opening on the side of the plate facing toward said outlet and the section of the damper element extending from said axis toward the rear wall of the casing having edge portions which overlap the corresponding edges of said opening on the side of the plate facing toward the inlet.

6. The combination as in claim 5 wherein said marginal edge portions of forwardly extending sections of the damper element and the associated edges of the opening are rectilinear and said marginal edge portions of the rearwardly extending section and the associated edges of said opening are smoothly arcuate.

7. The combination as in claim 3 wherein said mixing baffle structure has three horizontal rows of vanes arranged in superposed zones, the vanes in the uppermost and lowermost zones inclined in one sidewise direction with respect to said centerline, and the vanes in the intermediate zone inclined in the opposite sidewise direction with respect to the centerline.

8. The combination as in claim 3 wherein each zone has a greater number of vanes on one side of said centerline than on the other, the greater number in one zone being on the opposite side of the centerline from the greater number in the next adjacent zone.

9. The combination as in claim 3 wherein said damper elements are arranged with one in closed position and the other in open position, said means for pivoting said damper elements including link mechanism interconnecting said damper elements whereby pivoting of the closed element toward the open position causes pivoting the open damper element toward the closed position.

References Cited by the Examiner
UNITED STATES PATENTS

| 1,992,509 | 2/1935 | Slidell. |
| 2,028,985 | 1/1936 | Mahon. |
| 2,814,446 | 11/1957 | Phillips et al. _____ 98—38 |
| 2,959,116 | 11/1960 | O'Day et al. _____ 98—121 |
| 3,211,177 | 10/1965 | Phillips et al. _____ 98—38 X |

FREDERICK L. MATTESON, Jr., *Primary Examiner.*

ROBERT A. O'LEARY, *Examiner.*

C. R. REMKE, *Assistant Examiner.*